US 8,598,091 B2
Dec. 3, 2013

(12) United States Patent
Spangle

(10) Patent No.: US 8,598,091 B2
(45) Date of Patent: Dec. 3, 2013

(54) USE OF SEEDS AS A CEMENT SET RETARDER

(75) Inventor: Lloyd Spangle, Claremore, OK (US)

(73) Assignee: Catalyst Partners, Inc., Chico, TX (US)

( * ) Notice: Subject to any disclaimer, the term of this patent is extended or adjusted under 35 U.S.C. 154(b) by 0 days.

(21) Appl. No.: 13/263,932

(22) PCT Filed: Nov. 13, 2010

(86) PCT No.: PCT/US2010/056634
§ 371 (c)(1),
(2), (4) Date: Nov. 1, 2011

(87) PCT Pub. No.: WO2011/060336
PCT Pub. Date: May 19, 2011

(65) Prior Publication Data
US 2012/0160490 A1    Jun. 28, 2012

Related U.S. Application Data

(60) Provisional application No. 61/261,256, filed on Nov. 13, 2009.

(51) Int. Cl.
*C09K 8/60* (2006.01)
*C09K 8/68* (2006.01)
*E21B 33/13* (2006.01)

(52) U.S. Cl.
USPC ............... 507/204; 507/203; 166/292

(58) Field of Classification Search
USPC ............... 507/203, 204; 166/293, 294
See application file for complete search history.

(56) References Cited

U.S. PATENT DOCUMENTS

| 493,613 A | | 3/1893 | Bronson |
| 4,058,407 A | * | 11/1977 | Ray ............... 106/729 |
| 7,765,883 B1 | * | 8/2010 | Spangle ............... 73/866 |
| 2005/0111923 A1 | * | 5/2005 | Maile et al. ............... 405/263 |

FOREIGN PATENT DOCUMENTS

| JP | 2001000371629 | | 6/2003 |
| JP | 2002000210644 | | 2/2004 |
| SU | 274033 A | * | 6/1970 |
| SU | 382592 A | * | 8/1973 |
| WO | WO/97/16391 | | 5/1997 |

OTHER PUBLICATIONS

English translations of abstract and content of SU274033, 1970.*
English translations of abstract and content of SU 382592, 1973.*

* cited by examiner

*Primary Examiner* — Aiqun Li
(74) *Attorney, Agent, or Firm* — Charles D. Gunter, Jr.

(57) ABSTRACT

A cement retarder composition, method, kit and system are herein disclosed. Seeds are added to cement to delay the setting of cement. Cement retarders are added to cement to delay the setting of the cement until it is pumped to the desired position.

7 Claims, No Drawings

US 8,598,091 B2

USE OF SEEDS AS A CEMENT SET RETARDER

CROSS-REFERENCE TO RELATED APPLICATIONS

The present application claims priority from PCT/US2010/056634, having an international filing date of Nov. 13, 2010, which claimed priority from a U.S. Provisional Patent Application No. 61/261,256, filed Nov. 13, 2009, entitled "Use of Seeds As A Cement Set Retarder", by the same inventor.

FIELD

The field of the invention is generally compositions and methods for additions to cement, specifically to delay the setting of cement.

BACKGROUND

Cements are materials which set and harden after combination with water as a result of chemical reactions with the water. After hardening, cements retain strength and stability even upon exposure to water. Most construction cements today are hydraulic cements, and most of these are based upon Portland cement, which is made primarily from limestone, certain clay minerals, and gypsum in a high temperature process that drives off carbon dioxide and chemically combines the primary ingredients into new compounds.

Setting and hardening of hydraulic cements is caused by the formation of water-containing compounds as a result of reactions between cement components and water. The reaction and the reaction products are referred to as hydration, hydrates, or hydrate phases, respectively. As a result of the immediately starting reactions, a stiffening (loss of workability) can be observed which is very small in the beginning, but which increases with time. After reaching a certain level, this point in time is referred to as the start of setting. The consecutive further consolidation is called setting (solidification), after which the phase of hardening (strength gain) begins. The compressive strength of the material then grows steadily, over a period which ranges from a few days in the case of "ultra-rapid-hardening" cements, to several years in the case of ordinary cements.

Set retarders are used to prevent premature hardening of the slurry before it reaches the area to be cemented. Set retarders prolong the setting time of the cement to allow time for the cement to be pumped into place.

BRIEF SUMMARY

An embodiment is a composition comprising seeds and cement. In an embodiment, the seeds are mustard seeds. In an embodiment, the seeds are selected from the group consisting of navy beans, pinto beans, blackeye peas, popcorn, and dill seeds. In an embodiment, the composition further comprises water to form a cement slurry. In an embodiment, the seeds are whole. In another embodiment, the seeds are ground. In an embodiment, the mustard seeds are added at 0.1% to 2.0% by weight of cement. In another embodiment, the mustard seed are yellow. In yet another embodiment, the mustard seed are black. In an embodiment, the cement is Portland cement. In an embodiment, the mustard seeds are added at 0.1% to 2.0% by weight of cement. In an embodiment, the temperature of the cement slurry is greater than 165° F. In another embodiment, the temperature of the cement slurry is greater than 215° F.

An embodiment is a method of using seeds as a cement retarder. In an embodiment, the seeds are mustard seeds. In an embodiment, the method is for use in a well. In another embodiment, the method comprises combining mustard seeds, water, and cement to form a cement slurry; pumping the cement slurry down a casing; and allowing the cement to harden. In an embodiment, the temperature of the cement slurry is greater than 165° F. In another embodiment, the temperature of the cement slurry is greater than 215° F.

An embodiment is a kit comprising cement and mustard seed.

An embodiment is a cement retarder system comprising mustard seed.

DETAILED DESCRIPTION

The disclosure relates to seeds that delay the setting of cement. It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, methods, procedures and components have not been described in detail so as not to obscure the embodiments described herein.

Seeds such as mustard seed may be used as a cement set retarder. In one embodiment, mustard seed are used to delay the setting of Portland cement. Seeds may be used to delay the setting of any type of cement. The seeds may be whole or ground. In an embodiment, the seeds are ground to a fine powder.

Portland cement is the most common type of cement in general usage and is the basic ingredient of concrete, mortar, stucco and most non-specialty grout. It is a fine powder produced by grinding Portland cement clinker (more than 90%), up to about 5% gypsum which controls the set time, and up to about 5% minor constituents (as allowed by various standards). There are five types of Portland cements with variations of the first three according to ASTM C150. Type III Portland cement is very close in composition to Type I Portland cement and is generally of a finer grade than Type I Portland cement.

Type I Portland cement is known as common or general purpose cement. It is commonly used for general construction especially when making precast and precast and prestressed concrete that is not to be in contact with soils or ground water. The typical compound compositions of this type are 55% ($C_3S$), 19% ($C_2S$), 10% ($C_3A$), 7% ($C_4AF$), 2.8% MgO, 2.9% ($SO_3$), 1.0% ignition loss, and 1.0% free CaO.

Type III has a relatively high early strength. The typical composition of Type III is 57% ($C_3S$), 19% ($C_2S$), 10% ($C_3A$), 7% ($C_4AF$), 3.0% MgO, 3.1% ($SO_3$), 0.9% ignition loss, and 1.3% free CaO. The gypsum level may also be increased a small amount. This gives the concrete using this type of cement a three day compressive strength equal to the seven day compressive strength of types I and II. Other cement types include (high-early set) HE and class C cements. Calcium sulfoaluminate and calcium aluminate are fast setting hydraulic cements.

The API standards for cement separate cement into five classes. The classes are A (similar to ASTM Type I), B (similar to ASTM Type II), C (similar to ASTM Type III), G (similar to ASTM Type IV), and H (similar to ASTM Type IV). Classes A, B, and C are intended for use from the surface to 6,000 feet. Classes G and H are intended for use from the surface to 8,000 feet.

Classes G and H of cement are "obtained by grinding Portland cement clinker, consisting essentially of hydraulic calcium silicates, usually containing one or more of the forms of calcium sulphate as an interground addition. No additions other than calcium sulphate or water, or both, shall be interground or blended with the clinker during manufacture of Class G/H cement. This product is intended for use as a basic well cement. Available in moderate sulphate-resistant and high sulphate-resistant grades." API Specification 10A[3]. Class H cements are generally more coarsely ground than Class G cements.

Mustard seed is added at a concentration determined by standard American Petroleum Institute testing procedures that will give the desired delay to the hardening of Portland cement. In one embodiment, the mustard seed is added at 0.1% to 2.0% by weight of cement. In another embodiment, the mustard seed is added at 0.01% to 4.0% by weight of cement. ASTM procedures can also be utilized for design of concrete systems using mustard seed set retardation.

Although the exact processes by which cement hydrates are not understood, retarders in general delay the interlocking crystallization process of the calcium silicates present in Portland cement.

Standard testing procedures are available from API and ASTM publications which detail the methods used.

Since mustard seed affects of the hydration process of Portland cement, it is likely that material such as pozzolans, fly ash, or any material that involves calcium silicate or calcium aluminate crystallizations would also be altered by the presence of mustard seed.

Primarily the use of mustard seed in Portland cement can produce a desired, delayed hardening of the cement mixture. The use of mustard seed to control hardening of Portland cement does not have undesirable side effects such as viscosity alteration or increased toxicity. The mustard seed has the innate property of having fungicidal properties which will prolong shelf life.

Most retarders are expensive compared to common mustard seed. Most retarders require some degree of manufacturing processing. Some retarders are extremely temperature sensitive and concentration sensitive. Some retarders cause extreme viscosity changes. Mustard seed appears to be an easily adaptive admixture with high compatibility with other common cement additives.

In sub-surface oil and gas well completions, Portland cement is used to secure the casing in the well bore-hole. The cement must have added ingredients that delay the hardening until the cement is in the desired position. It has been found that mustard seed when mixed with the Portland cement delays hardening in a precise, controllable manner.

Mustard seed, whole or ground, will retard the hardening of Portland cement depending on the amount added and the temperature of the cement mixture. Delaying the hardening of cement is necessary when the cement is to be used in an application that requires several hours of liquid or pumpable consistency of the cement slurry in order to place the cement slurry in a desired location. This is most common for the cement systems used in oil and gas well completions. In such situations, the cement may be pumped several miles down casing at temperatures of several hundred degrees Fahrenheit and extremely high pressure. In order to achieve the placement of cement in such environments, the cement slurry needs to have "pourable" consistency until the cement slurry is in the desired locations between the well casing and the borehole formation. Once the cement has been successfully placed in position and allowed to harden, the well casing will be locked in place with a low permeability cement sheath in the annulus.

Common retarders used include lignins and sugars as well as some metal oxides and acids. Sodium lignosulfonates are common as retarders and usually also have a dispersing effect on the slurry. Other retarders can have an opposite effect and severely gel the cement slurry making it immediately unpumpable. There are situations where designed cement systems need a non-dispersing retarder that does not add viscosity to the cement slurry. This is the case when a coarse grind Portland cement may tend to settle during pumping or standing if it has been over dispersed. For such cement, a neutral or non-dispersing retarder that does not cause gellation of the cement slurry is needed. Mustard seed provides good results. In one embodiment, the mustard seed is yellow. In one embodiment, the mustard seed is black. In one embodiment, the mustard seed is white. In one embodiment, the mustard seed is brown. In one embodiment the mustard seed is ground. In one embodiment, the mustard seed is whole.

In an embodiment, any seeds or similarly shaped objects may be used to delay the setting of the cement. The seeds may be whole or ground. In an embodiment, navy beans, pinto beans, blackeye peas, popcorn, or dill seeds may be used to delay setting. In an embodiment, the seeds may be from other plants in the genus *Brassica* or any other seed that will delay setting of the cement. The genus *Brassica* includes plants such as broccoli, brussel sprouts, cabbage, rapeseed, canola, rutabaga, nabicol, Chinese cabbage, turnip, rapini, komatsuna, mustard spinach, and kale.

Analysis of mustard seeds indicates that the seeds contain approximately 28% proteins, 35% fatty oil, 2.4% sinalbin, a thioglycoside-like compound of glucose and p-hydroxybenzyl isothiocyanate ($HO-C_6H_4-CH_2-NCS$). When crushed the enzyme myrosinase hydrolyzes the sinalbin and produces free p-hydroxybenzyl isothiocyanate, a pungent and non-volatile substance.

Black mustard seeds, along with a number of other plants of the *Brassica* family, contain sinigrin. Sinigrin is a glucosinolate that is degraded to allyl isothiocyanate by myrosinase.

EXAMPLES

The following examples are included to demonstrate preferred embodiments of the present disclosure. It should be appreciated by those of skill in the art that the techniques disclosed in the examples which follow represent techniques discovered by the inventors to function well and thus can be considered to constitute preferred modes for its practice. However, those of skill in the art should, in light of the present disclosure, appreciate that many changes can be made in the specific embodiments which are disclosed and still obtain a like or similar result without departing from the spirit or scope of the disclosure. The following Examples are offered by way of illustration and not by way of limitation.

Example 1

The effect of ground or whole yellow mustard seed on the thickening time of Cemex Class H cement at 167° F. and 5000 psi was determined. The concentrations in the data listed in Table 1 are based on the weight of cement used. In Table 1, increasing percentages of yellow mustard seed by weight of cement increased the thickening time of the cement. In Table 1, the thickening time of the cement was similar with ground or whole yellow mustard seed. The amount of seed to add is determined by the American Petroleum Institute testing procedures to provide the desired delay to the hardening of the Portland cement.

TABLE 1

High pressure thickening time tests conducted using API-RP 10 standard testing procedures, 167° F., 5000 psi pressure, using Cemex class H Portland cement.

| Composition | Thickening Time |
| --- | --- |
| Class H cement + 38% water | 1 hour, 22 minutes |
| Class H cement + 38% water + 0.2% ground, yellow mustard seed | 1 hour, 48 minutes |
| Class H cement + 38% water + 0.2% whole, yellow mustard seed | 1 hour, 47 minutes |
| Class H cement + 38% water + 0.4% ground, yellow mustard seed | 3 hours, 43 minutes |
| Class H cement + 38% water + 0.6% ground, yellow mustard seed | >5 hours |

Example 2

The effect of ground yellow or ground black mustard seed on the thickening time of Lehigh Class H cement at 220° F. and 5000 psi was determined. The concentrations in the data listed in Table 2 are based on the weight of cement used. In Table 2, an increased percentage of yellow mustard seed by weight of cement increased the thickening time of the cement as did an increased percentage of ground black mustard seed. The same percentage of ground yellow and ground black mustard seed produced similar cement thickening time. The amount of seed to add is determined by the American Petroleum Institute testing procedures to provide the desired delay to the hardening of the Portland cement.

TABLE 2

High pressure thickening time tests conducted using API-RP 10 standard testing procedures, 220° F., 5000 psi pressure, using Lehigh class H Portland cement.

| Composition | Thickening Time |
| --- | --- |
| Class H cement + 42% water + 0.5% ground, yellow mustard seed | 1 hour, 49 minutes |
| Class H cement + 42% water + 0.75% ground, yellow mustard seed | 2 hours, 5 minutes |
| Class H cement + 42% water + 0.75% ground, black mustard seed | 2 hours, 6 minutes |
| Class H cement + 42% water + 1.0% ground, black mustard seed | 2 hours, 31 minutes |

Example 3

Other seeds were tested for retardation effects on the setting of cement. Various seeds tested included navy beans, pinto beans, blackeye peas, popcorn, and dill seed. The seeds were ground to a fine powder. Navy beans, pinto beans, blackeye peas, popcorn, and dill seed each demonstrated some degree of retardation.

Variations and modifications to the preferred embodiments of the invention described herein will be apparent to those skilled in the art. It is intended that such variations and modifications may be made without departing from the scope of the invention and without diminishing its attendant advantages.

All of the compositions and methods disclosed and claimed herein can be made and executed without undue experimentation in light of the present disclosure. While the compositions and methods of this invention have been described in terms of preferred embodiments, it will be apparent to those of skill in the art that variations may be applied to the compositions and methods and in the steps or in the sequence of steps of the methods described herein without departing from the concept, spirit and scope of the invention. More specifically, it will be apparent that certain agents which are both chemically and physiologically related may be substituted for the agents described herein while the same or similar results would be achieved. All such similar substitutes and modifications apparent to those skilled in the art are deemed to be within the spirit, scope and concept of the invention as defined by the appended claims.

What is claimed is:

1. A retarded cement composition comprising:
   a hydraulic cement and a given quantity of seeds, the given quantity of seeds being effective to retard an otherwise longer setting time of the cement composition;
   wherein the seeds are mustard seeds, present in an amount of from 0.1 to 2.0% by weight of cement, and
   wherein the seeds are whole.

2. The composition of claim 1, further comprising water to form a cement slurry.

3. The composition of claim 1, wherein the mustard seeds are yellow.

4. The composition of claim 1, wherein the mustard seeds are black.

5. The composition of claim 1, wherein the cement is Portland cement.

6. The composition of claim 2, wherein the temperature of the cement slurry is greater than 165° F.

7. The composition of claim 2, wherein the temperature of the cement slurry is greater than 215° F.

* * * * *